Figure 1:
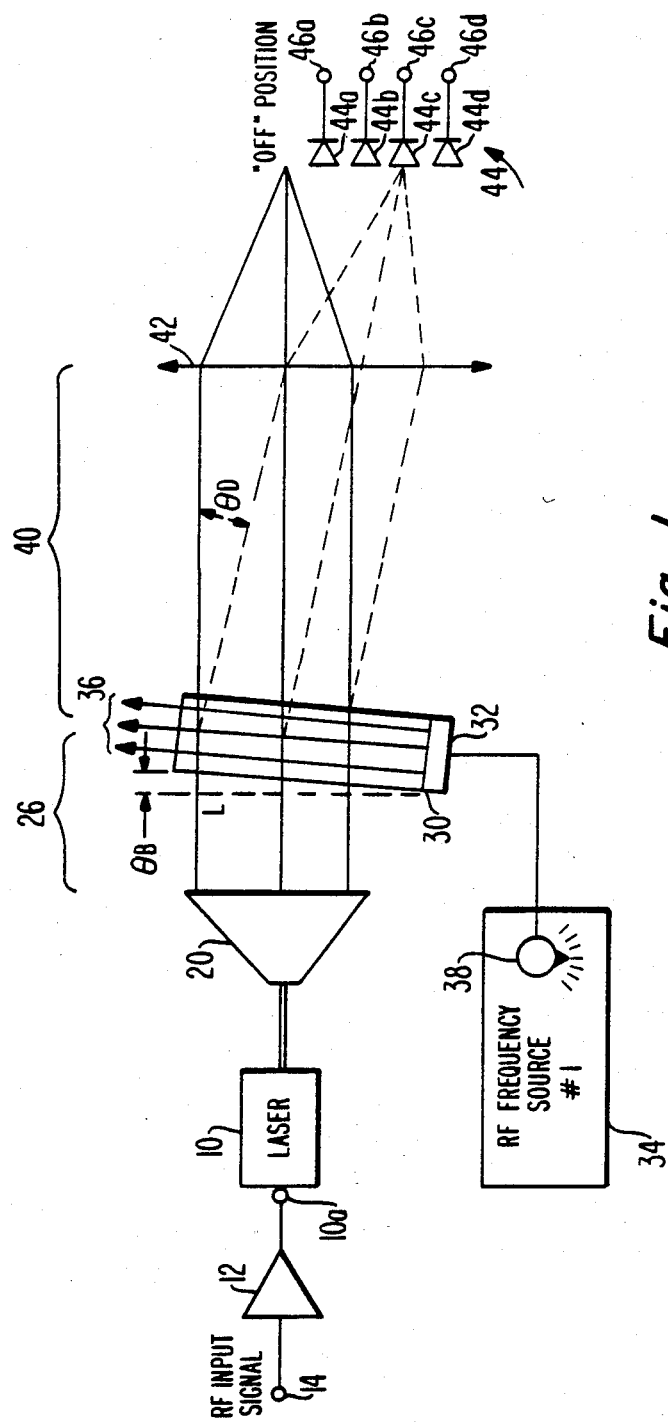

United States Patent [19]

Wolkstein

[11] Patent Number: 4,530,573
[45] Date of Patent: Jul. 23, 1985

[54] OPTOELECTRONIC MULTIPOSITION RF SIGNAL SWITCH

[75] Inventor: Herbert J. Wolkstein, Livingston, N.J.

[73] Assignee: RCA Corporation, Princeton, N.J.

[21] Appl. No.: 411,827

[22] Filed: Aug. 26, 1982

[51] Int. Cl.³ .................................................. G02F 1/11
[52] U.S. Cl. .................................. 350/358; 350/96.13
[58] Field of Search ..................... 350/358, 96.13; 343/9 PS

[56] References Cited

U.S. PATENT DOCUMENTS

| | | | |
|---|---|---|---|
| 3,878,520 | 4/1975 | Wright et al. | 343/368 |
| 4,092,060 | 5/1978 | Nunoshita et al. | |
| 4,143,939 | 3/1979 | Desormiere et al. | |
| 4,274,710 | 6/1981 | Nagao. | |
| 4,297,704 | 10/1981 | Marom et al. | |
| 4,395,702 | 7/1983 | Gottlieb et al. | 350/358 X |
| 4,448,494 | 5/1984 | Freyre | 350/96.13 |

FOREIGN PATENT DOCUMENTS 8303506 10/1983 World Intel. Prop. Org. ................................ 350/96.13

OTHER PUBLICATIONS

Shah, "Fast Acousto-Optical Waveguide Modulators", Appl. Phys. Lett., vol. 23, No. 2, 7/1973, pp. 75–77.
"Acousto-Optics Advance ESM", by J. H. Collins, MSN, Dec. 1979, pp. 37–44.
"Integrated Optical RF Spectrum Analyzer", by D. Mergerian and E. C. Malarkey, *Microwave Journal*, Sep. 1980, pp. 37–48.

Primary Examiner—John K. Corbin
Assistant Examiner—Lynn Vandenburgh Kent
Attorney, Agent, or Firm—Joseph S. Tripoli; Robert L. Troike; Raymond E. Smiley

[57] ABSTRACT

A laser is modulated in accordance with an input signal of time varying value. The modulated beam is intercepted by a Bragg cell acoustically modulated in accordance with one or more preselected control frequencies from a selectable source of such frequencies. The beam is deflected by an amount or amounts dependent on the acoustically modulated frequency or frequencies. A plurality of photodetectors are positioned to intercept the deflected beam at its respective possible deflection angles and to convert optical signals so recieved into electrical output signals. Thus by choice of control frequency, a signal corresponding to the input signal can be caused to appear at the output of one or more photodiodes.

8 Claims, 2 Drawing Figures

OPTOELECTRONIC MULTIPOSITION RF SIGNAL SWITCH

This invention relates to RF signal switches and more particularly to such switches using optoelectronics.

In communications work and other uses there is a need to switch a radio frequency (RF) input signal particularly in the microwave frequency range to a selectable one or more of a plurality of output terminals. The conventional structure for accomplishing this task involves a plurality of switching transistors, each with bulky RF matching circuits, thus requiring a relatively large number of components for even a relatively modest size switch. In communications satellites where such switches are typically utilized, any reduction in volume and weight is welcomed.

In accordance with a preferred embodiment of the present invention, a multiposition RF switch comprises in combination a means producing a collimated light beam and adapted for modulation in accordance with the time variant value of an RF input signal, a means producing an RF control signal at a selectable one of a plurality of preselected frequencies and means positioned in the path of the light beam and responsive to the control signal for producing acoustic waves at a frequency dependent on that of the control signal for causing the light beam to be deflected by an angle which is a function of which selectable frequency is selected. The combination also includes means having a plurality of output terminals receptive of the deflected beam for producing a signal at one of the plurality of output terminals dependent on the angle through which the beam is deflected whereby a signal corresponding to the input signal is directed to one of the output terminals as a function of the value of the RF control signal.

Figure 2:
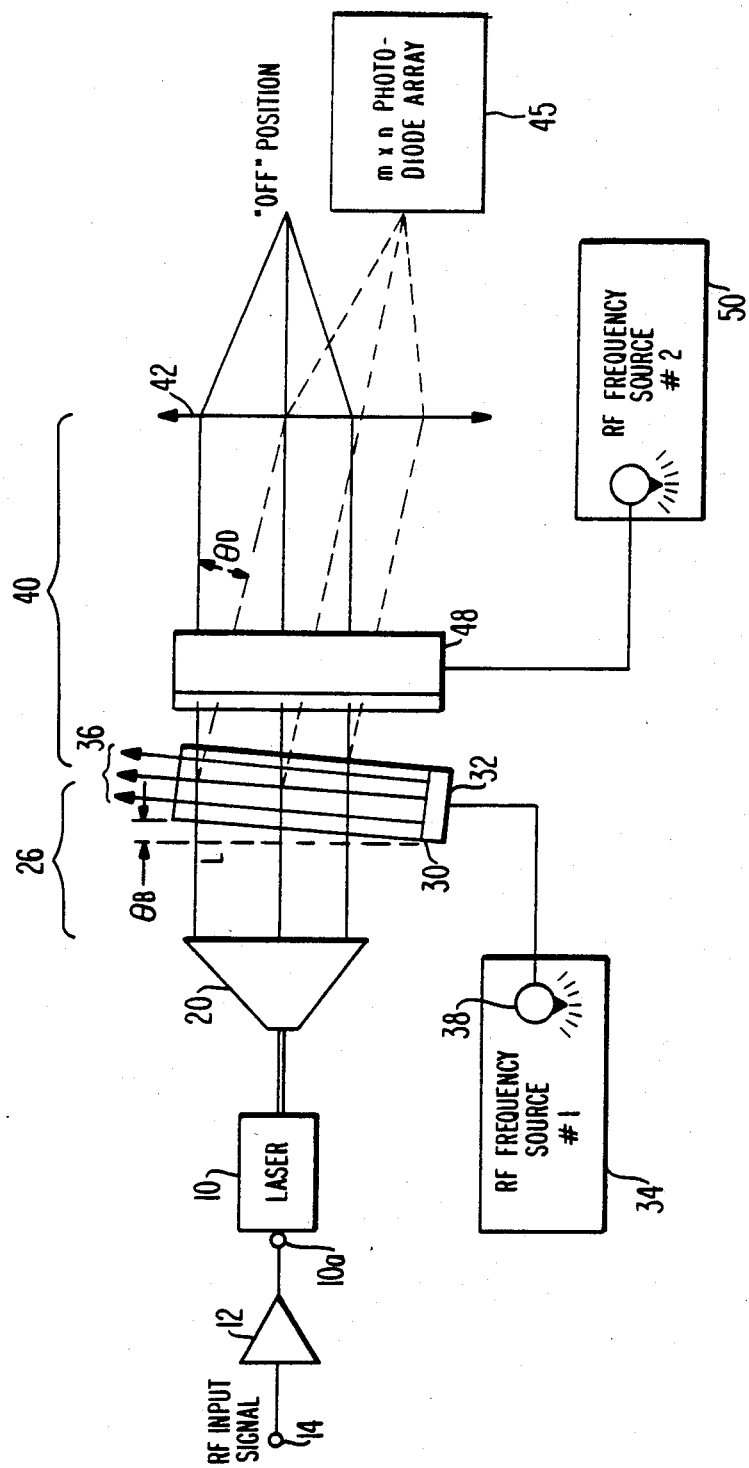

In the drawing:

FIG. 1 is a 1×n array optoelectronic multiposition RF switch system in accordance with a preferred embodiment of the present invention and FIG. 2 is an m×n array optoelectronic multiposition RF switch system in accordance with an alternative preferred embodiment of the present invention.

In FIG. 1 a laser 10 typically may be a gallium arsenide (GaAs) solid state modulated laser operating at a center frequency of 2 GHz for example. A laser driver amplifier 12 is coupled to the modulation terminal 10A of laser 10. Amplifier 12 typically may comprise a GaAs FET or bipolar active device which has provision for matching the impedance of the laser input circuit. The driver modulates the light output intensity of the laser in accordance with the input signal. System input terminal 14 is coupled to amplifier 12. An RF input signal at terminal 14 via laser driver 12 modulates laser 10 at the frequency of the RF input signal. The modulating signal which modulates the laser about its quiescent operating point may take any shape. That is, sine wave, square wave or any type modulation can be used.

The light signal from laser 10 passes through conventional beam expander optics 20. Typically optics 20 spreads the beam of light produced by laser 10 to a collimated beam of light of, for example, one millimeter in diameter. The beam is of circular form.

The collimated beam emerging from optics 20, legended 26 in the sole FIGURE is directed toward a Bragg cell acoustical deflector 30. Bragg cell acoustical deflector 30 typically may be made of ferroelectric material such as lithium niobate. One such Bragg cell is the Itek ATI L500 sold by Itek Measurement systems, Newton, Mass. Bragg cell 30 includes at one end thereof an electrical-to-acoustic transducer 32. A source 34 of RF frequency is coupled to transducer 32 to supply RF signals to be converted by transducer 32 to a broad beam (illustrated as elongated arrows 36 in FIG. 1) of acoustic rays at the same frequency or frequencies as produced by source 34 and directed through Bragg cell 30. Bragg cell 30, and thus beam 36, is offset from the normal beam 26 by the Bragg angle $\theta B$, the value of which is a function of the particular material chosen for the Bragg cell.

Source 34 is adapted to produce a number of selected frequencies, either singly or in combination under some control means which is illustrated in FIG. 1 as a multiposition switch 38. In a practical embodiment, the function of switch 38 typically would be performed by electronic means (not shown). The frequencies produced by source 34 can range, for example, from 300 to 500 steps of 1 MHz or more. The frequencies when translated to acoustic waves by transducer 32 propagate through the Bragg cell 30 wherein their alternating rarefactions and condensations cause variations in the optical index of refraction and thus form, in effect, moving diffraction gratings having grating periods determined by the acoustic frequency or frequencies present at any instant. The gratings interact with collimated light beam 26 causing some of the light to be diffracted or deflected. The angle of deflection and the fraction of light deflected are determined respectively, by the periods set by the acoustic or RF frequency from source 34 and the depth of the ruling set by the acoustic intensity proportional to the incident RF power.

The beam which is deflected by Bragg cell 30 is identified by the legend 40 in FIG. 1. The deflected beam which is deflected through an angle $\theta D$ with regard to the beam 26 by Bragg cell 30 impinges upon a Fourier transform lens illustrated as double ended arrow 42 whereby the beam rays are caused to converge to a point of typically 5 micrometers diameter at the interface with a 1×n matrix (where n is an integer greater than one) of photodiodes generally legended 44. In FIG. 1 four such photodiodes 44a, 44b, 44c and 44d, having respective output terminals 46a, 46b, 46c and 46d, are illustrated.

The diode-to-diode spacing may be one beam width at the matrix 44 or typically 5 micrometers. Each of photodiodes 44 may typically be 3 micrometers in diameter. The photodiodes 44 are P/N junction diodes in an integrated stripline or waveguide array capable of responding to laser light impulses of less than 1 nanosecond in duration.

With reference now to FIG. 2, the figure is identical to FIG. 1 except that an m×n photodiode matrix 45 is illustrated (where m and n are integers greater than one and m may be equal or unequal to n) and a second Bragg cell deflector 48 similar to Bragg cell deflector 30 is employed. Bragg cell deflector 48 is positioned between Bragg cell deflector 30 and Fourier transform lens 42. A second source of RF frequencies 50 is coupled to the Bragg cell 48 to control its operation in a manner similar to that in which source 34 controls the operation of Bragg cell deflector 30. The purpose of Bragg cell deflector 48 is to deflect the collimated light beam 26 normal to the deflection directions caused by Bragg cell deflector 30.

Operation of the system of FIG. 1 is as follows. An RF input signal is applied to terminal 14. Switch 38 of RF frequency source 34 is adjusted to produce a frequency or frequencies dependent on which one or more of diodes 44a, 44b, 44c and 44d an optical signal, corresponding to the signal applied to terminal 14, is to be passed. The signal applied to terminal 14 is converted to an optically modulated signal by laser 10 and converted by beam forming optics 20 to a collimated beam of light 26 which impinges upon Bragg cell deflector 30 at fixed angle 90°-θB with regard to the direction of acoustically propagated signal through deflector 30. The frequency of the acoustic signal is determined by source 34 in accordance with the setting of switch 38 to cause beam 26 to be deflected through a desired angle or angles relative to beam 36 to impinge upon a particular one or ones of diodes 44. As illustrated in FIG. 1, the signal is directed toward diode 44c wherein it is converted back to an electrical signal to be outputted at terminal 46c to circuitry (not shown). By a different choice of frequency or frequencies from source 34, the optical signal could be directed to any of the other three diodes illustrated or to more than one diode including all the diodes. The operation of the circuit of the system of FIG. 2 is identical to that of FIG. 1 except that a frequency source 50 is also adjusted to cause deflector 48 to direct the beam in a plane normal to the drawing page and thus to a desired diode or diodes in diode array 45.

The optoelectronic switch just described is to be contrasted with an RF spectrum analyzer of the type described in an article entitled "Acoustic-optics Advance ESM" by J. H. Collins in Microwave Systems News, Dec. 1979, pp. 37-44. As described in that article, the RF spectrum analyzer includes components which are similar to some of those described in connection with the instant invention. In the article, a laser is utilized to create a collimated beam of light but the laser is operated at a fixer frequencey and is not modulated by an input signal. In the spectrum analyzer the transducer, part of the Bragg cell, is operated by an RF input signal of unknown frequency or frequencies. The unknown frequency or frequencies cause the collimated light beam produced by the unmodulated laser to be deflected in accordance with the frequency or frequencies of the unknown signal to a nonpreknown photodiode or photodiodes of a photodiode array from which can be determined what frequency or frequencies are present in the spectrum. The disclosed invention differs from the spectrum analyzer in that an RF modulated laser source is utilized which contains the signal which will undergo switching to the desired output port. In addition, the signal frequency to the Bragg cell is fixed, depending on the switched position required.

What is claimed is:

1. An optoelectronic switch for switching an RF input signal to one of a plurality of output terminals comprising in combination:

first means producing a collimated light beam which is modulated in accordance with the time varying value fo said RF input signal;

second means producing an RF control signal at a selectable one of a plurality of preselected frequencies;

third means positioned to intercept said collimated beam and responsive to said control signal for producing acoustic waves at a frequency dependent on that of said control signal for causing said beam to be deflected in passing through said third means by an angle dependent on said control signal frequency;

a plurality of optical pickup devices, positioned to intercept the deflected beam at different ones of its deflection angles, respectively whereby the optical beam may be directed to a specific one of said pickup devices depending on the particular preselected frequency produced by said control signal.

2. The combination as set forth in claim 1 wherein said first means comprises a laser.

3. The combination as set forth in claim 2 wherein said first means further comprises beam forming optics in the path of said beam of expanding the beam of light produced by said laser.

4. The combination as set forth in claim 1 wherein said third means includes an acoustic-optic deflector positioned to intercept said beam, said deflector being responsive to said control signal for causing the deflection of said beam in accordance with the value of said control signal.

5. The combination as set forth in claim 1 wherein said third means comprises a Bragg cell.

6. The combination as set forth in claim 1 wherein said plurality of optical pickup devices comprise a plurality of photodiodes receptive of a deflected optical signal for producing a corresponding modulated electrical signal.

7. The combination as set forth in claim 1 further including fourth means producing an RF control signal at a selectable one of a plurality of preselected frequencies and further including fifth means similar to said third means also positioned to intercept said collimated light beam and responsive to said control signal from said fourth means for producing acoustic waves for causing said beam to be deflected in passing through said fifth means through an angle dependent on the control signal frequency of said fourth means, said angle lying in a plane normal to the angle of deflection caused by said third means.

8. The combination as set forth in claim 1 wherein said second means produces two of said plurality of preselected frequencies and wherein said third means is responsive to said two selected frequencies for deflecting said signal passing therethrough by two angles corresponding to the said selected control frequencies and wherein said deflected signal strikes two of said plurality of optical pickup devices.

* * * * *